(12) United States Patent
Nozaki et al.

(10) Patent No.: US 6,822,358 B2
(45) Date of Patent: Nov. 23, 2004

(54) SPINDLE MOTOR AND MANUFACTURE THEREOF

(75) Inventors: Tsutomu Nozaki, Kashiwa (JP);
Tadayoshi Yano, Kashiwa (JP);
Toshikazu Takehana, Edozaki (JP);
Hidekazu Tokushima, Kashiwa (JP);
Yuji Yoshitomi, Chiyoda (JP)

(73) Assignees: Hitachi, Ltd., Tokyo (JP); Hitachi Powdered Metals Co., Ltd., Chiba (JP)

( * ) Notice: Subject to any disclaimer, the term of this patent is extended or adjusted under 35 U.S.C. 154(b) by 0 days.

(21) Appl. No.: 10/244,457

(22) Filed: Sep. 17, 2002

(65) Prior Publication Data

US 2003/0102742 A1 Jun. 5, 2003

(30) Foreign Application Priority Data

Dec. 3, 2001 (JP) ........................................ 2001-368084

(51) Int. Cl.[7] ................................................ H02K 7/08
(52) U.S. Cl. ............................................ 310/90; 310/42
(58) Field of Search ....................... 310/90.5, 42, 68 R, 310/90

(56) References Cited

U.S. PATENT DOCUMENTS

| | | | | |
|---|---|---|---|---|
| 5,490,021 A | * | 2/1996 | Muller et al. | ............. 360/98.07 |
| 5,559,382 A | * | 9/1996 | Oku et al. | ................... 310/90 |
| 5,957,589 A | * | 9/1999 | Lee et al. | .................. 384/112 |
| 6,097,121 A | * | 8/2000 | Oku | ............................. 310/91 |
| 6,201,328 B1 | * | 3/2001 | Teshima | ...................... 310/90 |

OTHER PUBLICATIONS

JP-A-6-178491.
JP-A-2000-81029.

* cited by examiner

*Primary Examiner*—Burton S. Mullins
*Assistant Examiner*—Nguyen Hanh
(74) *Attorney, Agent, or Firm*—Antonelli, Terry, Stout & Kraus, LLP

(57) ABSTRACT

A spindle motor having a bearing housing and a thrust bearing fitted in the bearing housing at the lower end of the latter, in which an inclined part is formed on the outer peripheral edge at the lower end of the thrust bearing, and the outer diameter part of the thrust bearing is fitted in a coupling bore formed in the end surface of the bearing housing, the end surface of the bearing housing being pressed uniformly in the axial direction over the entire circumference around the coupling bore to cause the bearing housing to plastically flow around the coupling bore in order to cover the above-mentioned inclined part of the thrust bearing. The above-mentioned covering part formed in the bearing housing through plastic flow can exhibit a high bonding strength between the bearing housing and the thrust bearing in the spindle motor without deteriorating the sealing ability of the spindle motor, due to a shearing force and a residual contact pressure of the covering part.

16 Claims, 5 Drawing Sheets

SPINDLE MOTOR AND MANUFACTURE THEREOF

BACKGROUND OF THE INVENTION

1. Field of the Invention

The present invention relates to a spindle motor used in a drive unit for a hard disc apparatus in a computer or the like, a DVD unit, a CD-RPM unit or the like, and to a method of manufacturing thereof. In particular, the present invention relates to a spindle motor having a hydrodynamic bearing structure as a drive motor for a thin hard disc drive apparatus installed in a portable personal computer such as a notebook type personal computer, and a method of manufacturing thereof.

2. Related Art

Conventionally, a bearing housing and a thrust bearing in a spindle motor have been coupled with each other by means of press-fitting, shrinkage-fitting, adhesive-bonding, welding or the like.

Further, there have been coupled with each other by a coupling method using a plastic deformation process as disclosed in JP-A-6-178491, or a coupling method using a tight coupling force caused by plastic flow as disclosed in JP-A-2000-81029.

However, the conventional coupling methods have caused the following problems in the case of joining a thrust bearing (having, for example, an outer diameter of 5 mm and a thickness of 1 mm) to a bearing housing of a spindle motor having a hydrodynamic bearing structure, for a 2.5 inch type thin hard disc apparatus:

As well-known, the press-fitting has a limited bonding strength, and in particular, it is inferior to shock-resistance. Further, the shrinkage fitting cannot ensure a sufficient shrinkage fitting margin since the bearing has a small diameter, and accordingly, it also has a limited bonding strength. Further, since the shrinkage fitting requires heating, accordingly, after shrinkage fitting, the degree of accuracy becomes inferior, and a finishing process is required after the joining thereof. Further, heating and cooling thereof are time-consuming, resulting in low productivity.

The adhesive bonding has a limited coupling strength since the bonding length is short, and accordingly, it is inferior to shock-resistance. Further, extra adhesive having oozed out from the juncture detrimentally affects the performance of the motor, and curing of an adhesive is time-consuming, resulting in low productivity.

The welding causes thermal deformation, and in particular causes a warp due to thermal-contraction. Thus, accuracy cannot be ensured. Further, a shaft made of a material having a martensitic structure with a high carbon content, such as SUS404C, causes cracking. Further, the welding requires an expensive facility such as a laser welder.

As to a joining method using a plastic deformation process as disclosed in JP-A-6-178491, in the case of plastic-deformation of a juncture over its entire periphery, corrugation (buckling) is caused in the plastically deformed zone, which would possibly cause external leakage of fluid from a bearing housing therethrough. Further, should the zone where plastic deformation is made be divided into several parts, the fluid would possibly leaks externally from the bearing housing through parts where no plastic deformation is made. Further, as an axially exerted load is applied in a cicumferentially discrete condition, inhomogeneous force is circumferentially exerted to the thrust bearing or the bearing housing which would be deformed so as to cause a risk of rotational oscillation of the shaft.

As a tight juncture forming method using the plastic flow disclosed in JP-A-2000-81029, it is required to enhance the bonding strength and to increase the working load in order to prevent leakage of fluid from the bearing housing, and accordingly, the radial bearing or the like would deform, resulting in lowering of the performance of the spindle motor.

SUMMARY OF THE INVENTION

An object of the present invention is to provided a spindle motor having an enhanced bonding strength of the juncture between the bearing housing and the thrust bearing with no deterioration of accuracy and sealing ability.

To the end, according to the present invention, there is provided a method comprising the steps of inserting or press-fitting an outer cylindrical portion of a thrust bearing having an annular inclined surface at the outer periphery of an axially end part thereof in an coupling bore formed in an end surface of a bearing housing, and pressing the end surface of the bearing housing around the coupling bore over its entire periphery of the latter, so as to allow plastic flow of the base material around the inner periphery of the coupling bore, and thereby, the annular inclined surface at the outer periphery of the end part is covered with the base material of the bearing housing which has been subjected to plastic flow. Thus, the thrust bearing and the bearing housing are coupled with each other so that the material of the bearing housing can obtain a shearing strength and a residual contact pressure after application of a compression load.

Specifically, according to a first aspect of the present invention which can achieve the above-mentioned purposes, there is provided a spindle motor including a stator core, and comprising, inside of the stator core, a cylindrical bearing housing, a hydrodynamic bearing metal and a shaft fixed at its one end to a hub, which are coaxially arranged in the mentioned order as viewed inward from the stator core, and also comprising a thrust bearing fixed to an inner peripheral surface at an end part of the bearing housing on the side remote from the hub, for bearing a thrust of the shaft, fluid being filled between the shaft and the hydrodynamic bearing metal, wherein an annular inclined surface is formed on an outer peripheral edge at an end part of the thrust bearing on the side axially remote from the hub, the annular inclined surface having an outer diameter which decreases toward the end part on the side axially remote from the hub, an inner peripheral edge at the end part of the bearing housing on the side axially remote from the hub is bulged out toward the inclined surface through plastic deformation so as to abut against and join with the latter.

According to a second aspect of the present invention which can achieve the above-mentioned purpose, there is provided a spindle motor including a stator core, and comprising, inside of the stator core, a cylindrical bearing housing, a hydrodynamic bearing metal and a shaft fixed at its one end to a hub, which are coaxially arranged in the mentioned order as viewed inward from the stator core, and also comprising a thrust bearing fixed to an inner peripheral surface at an end part of the bearing housing on the side remote from the hub, for bearing a thrust of the shaft, fluid being filled between the shaft and the hydrodynamic bearing metal, wherein an annular inclined surface is formed on an outer peripheral edge at the end part of the thrust bearing on the side axially remote from the hub, the annular inclined surface having an outer diameter which decreases toward the end part on the side axially remote from the hub, an inner peripheral edge of the end part of the bearing housing on the side axially remote the hub is bulged out toward the inclined surface so as to abut against and join with the latter, the bulged portion having a metal structure which is flatted in a direction along the outer surface of the bulged portion.

The inclined surface formed in the thrust bearing may have such a sectional shape in a cutting plane including the axis of the thrust bearing as to be of a straight line or a part of an arc.

Further, it is desirable that the inclined surface formed on the outer peripheral edge of the thrust bearing on the large diameter side is made into contact with the inner peripheral of the bearing housing.

Further, it is desirable that a part having a diameter smaller than that of the outer periphery of the thrust bearing is present in the bearing housing, coaxial therewith, and the thrust bearing is interposed between the plastically deformed part of the bearing housing and a stepped part at the end surfaced of the small diameter part of the thrust bearing, directly or through the intermediary of other members.

Further, according to a third aspect of the present invention which can achieve the above-mentioned problems, there is provided a method of manufacturing a spindle motor including a stator core, and comprising, inside of the stator core, a cylindrical bearing housing, a hydrodynamic bearing metal and a shaft fixed at its one end to a hub, which are coaxially arranged in the mentioned order as viewed inward from the stator core, and also comprising a thrust bearing fixed to an inner peripheral surface in an end part of the bearing housing on the side remote from the hub, for bearing a thrust of the shaft, fluid being filled between the shaft and the hydrodynamic bearing metal, comprising the steps of forming an annular inclined surface having a diameter which is decreased toward the end part on the side axially remote from the hub, on an outer peripheral edge of thrust bearing on the side axially remote from the hub, fitting the thrust bearing in the bearing housing up to a predetermined position, thereafter pressing the peripheral edge of the end part of the bearing housing on the side remote from the hub, simultaneously over its entire periphery in the axial direction so as to cause plastic flow of the inner peripheral edge which therefore bulges out over the inclined surface of the thrust bearing so as to abut against and join with the inclined surface.

In the above-mentioned manufacturing method, the annular inclined surface formed in the thrust bearing may have such a sectional shape so as to be of a straight line or a part of an arc in a cutting plane including the axis of the thrust bearing.

According to the present invention having the above-mentioned constructions, the juncture between the thrust bearing and the bearing housing has a sufficient bonding strength without deteriorating the accuracy and the sealing ability thereof, thereby it is possible to join the thrust bearing and the bearing housing with each other with a high degree of productivity using an inexpensive facility.

The present invention will be detailed in the form of preferred embodiments of the present invention with reference to the accompanying drawings in which:

DESCRIPTION OF THE PREFERRED EMBODIMENTS

Figure 10:
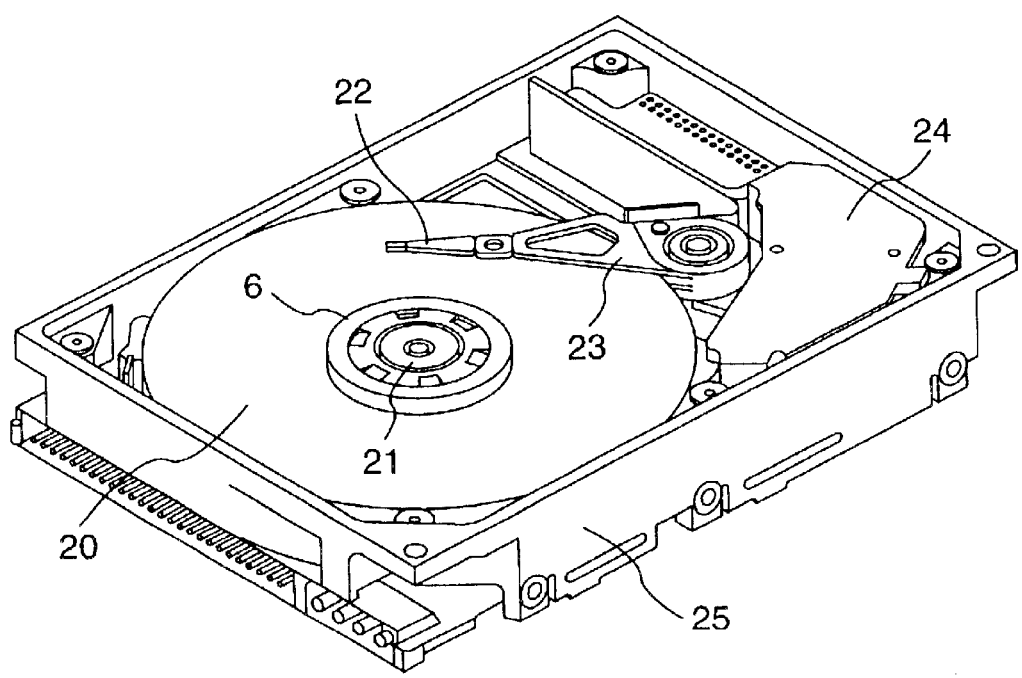
FIG. 10 is a perspective view illustrating a hard disc apparatus according to an embodiment of the present invention.

Referring to FIG. 10 which shows a 2.5 inch type thin hard disc apparatus according to an embodiment of the present invention, the hard-disc apparatus comprises a disc 20 as data recording media, a spindle motor 21 for carrying and rotating the disc 20, a head 22 provided on the surface of the disc, for recording data onto the disc and reading data therefrom, a carriage 23 supported so as to be pivotable in a plane substantially parallel with the surface of the disc 20, and supporting the head 22 at its distal end, for shifting the head, substantially radial of the disc 20, a drive unit for pivotably driving the carriage 23 and a body casing 25 accommodating and sealingly enclosing therein the disc 20, the spindle motor 21, the head 22, the carriage 23 and the drive unit 24.

Figure 1:
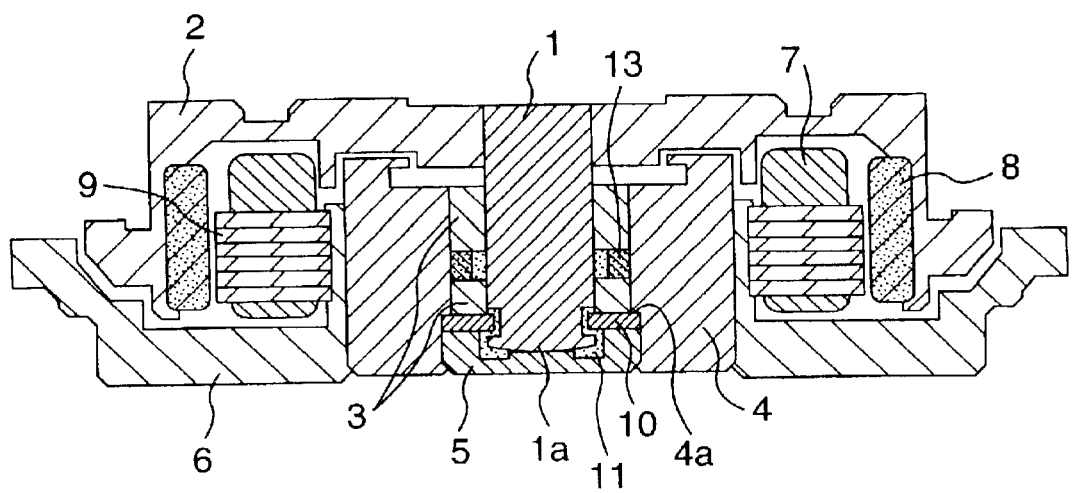
FIG. 1 is a longitudinal sectional view illustrating a spindle motor having a hydrodynamic bearing using a combination of a thrust bearing and a bearing housing in an embodiment of the present invention.

FIG. 1 is a sectional view illustrating a spindle motor 21 which is an example of a hydrodynamic bearing spindle motor using a combination of a bearing housing and a thrust bearing according to the present invention, the upper part portions shown on the upper side in FIG. 10 being shown in the upper side in this figure. The subject hydrodynamic bearing spindle motor is the one which can be applied for the 2.5 inch type thin hard disc apparatus.

The spindle motor shown in FIG. 1, comprises an annular base 6 incorporating a cylindrical portion in the center part thereof around the axis thereof, a cylindrical bearing housing 4 having an axially extending bore and coaxially fitted and fixed to an inner peripheral surface of the cylindrical portion of the annular base 6, a stator core 7 wounded thereon with copper wires 9 and fixed to an outer peripheral surface of the cylindrical portion of the base 6, an annular hydrodynamic bearing metal 3 coaxially fixed to the inner peripheral surface of the bearing housing 4, a shaft 1 rotatably fitted in a bore in the hydrodynamic bearing metal 3, a dish-like hub 2 fixed to the upper end of the shaft 1, a magnet 8 attached to the inner peripheral surface of an outer peripheral side end part of the hub 2 so as to be opposed to the stator core 7, and a thrust bearing 5 fitted and fixed in the lower end part of the bore of the bearing housing 4 (that is, the part where the inner diameter of the bore of the bearing housing 4 is greater than that of the upper part thereof, and called as a coupling bore 4a) with a stopper ring 10 being interposed between the thrust bearing 5 and a stepped part defined in the coupling bore 4a between the upper part and the lower part having an inner diameter which is greater than that of the upper part, and making contact with a spherical end part 1a at the lower end of the shaft 1 so as to bear a thrust from the shaft. Magnetic fluid 11 is filled in a gap defined by the hydrodynamic bearing metal 3, the outer peripheral surface of the shaft 1 and the thrust bearing 5, and is held by a magnet 13. The part having an inner diameter greater than that of the upper part in the bearing housing 4, corresponding to the outer peripheral part of the lower end part of the shaft 4, that is, the coupling bore 4b is fitted therein with the thrust bearing 5.

The hydrodynamic bearing metal 3 constitutes a radial bearing due to a dynamic pressure effect which is induced in the magnetic fluid 11 filled in the bearing housing 4 by the rotation of the shaft 1. Should the magnetic fluid leak external of the bearing housing 4, it would possibly stick to the magnetic disc attached to the hub 2 or the like. Accordingly, the magnetic fluid 11 has to be completely sealed and enclosed in the bearing housing 4.

The leakage of the magnetic fluid 11 is roughly grouped in two cases in one of which the magnetic fluid 11 leaks out from the upper part of the shaft after passing through a gap between the shaft 1 and the hydrodynamic bearing metal 3, and in the other one of which the magnetic fluid 11 leaks out from the lower part of the shaft after passing through a gap between the bearing housing 4 and the thrust bearing 5. The leakage from the upper part can be prevented by holding the magnetic condition by means of the magnet 13. It is noted that if fluid capable of sustaining a surface tension with which the fluid cannot leak through the gap between the shaft 1 and the hydrodynamic bearing 3, is enclosed in the gap defined between the hydrodynamic bearing 3, the outer peripheral surface of the shaft 1 and the thrust bearing 5, no provision of the magnet 13 is required. The leakage from the lower part cannot be sufficiently prevented by the magnet 13 since the retention of the magnet 11 for the magnetic fluid 11 is lower due to a distance between the position of possible leakage and the magnet 13 which is longer than that in the case of the leakage from the upper part. Thus, the sealing ability of the coupling between the bearing housing 4 and the thrust bearing 5 has to be sufficiently ensured.

It is desirable that the bearing housing 4 as a joining member is made of a material which is highly plastic-deformable, having a deformation resistance which is lower than that of the thrust bearing 5 as a joined member. In this embodiment, SUS303 is used as the material for the bearing housing 4, and SUS430 is used as the material for the thrust bearing 5.

The thrust bearing bearing 5 as the joined member is formed at the outer peripheral edge of the lower end thereof with an inclined part 5a having an outer diameter which is smaller and smaller downward. The configuration of the inclined part will be detailed hereinbelow. The dimensions of the thrust bearing 5 are such that the outer diameter thereof is 5 mm and the axial thickness of the other peripheral part thereof is 1 mm.

First Embodiment

Figure 2:
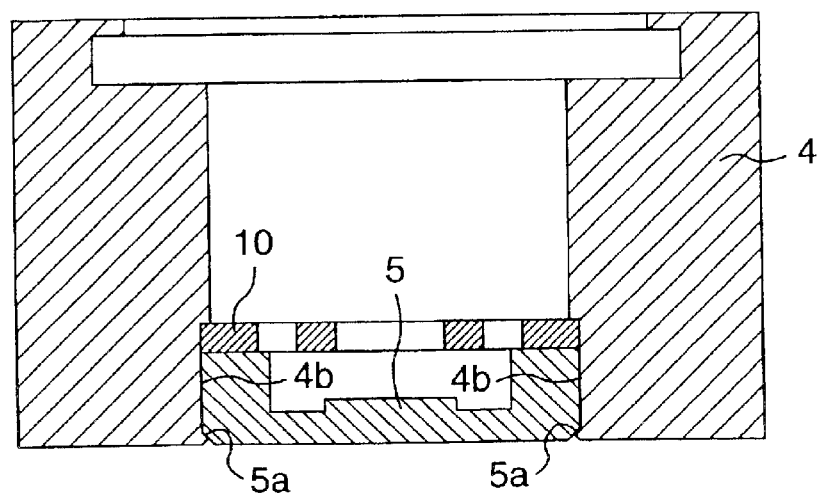
FIG. 2 is a longitudinal sectional view illustrating a first embodiment of the present invention.

Referring to FIG. 2 which shows a combination of the bearing housing 4 and the thrust bearing 5 in a first embodiment of the present invention. An annular inclined part having a diameter which is smaller and smaller downward, is formed on an outer peripheral edge at the lower end part of the thrust bearing 5, and is joined in the coupling bore 4b in the bearing housing 4 through plastic deformation in a method which will be hereinbelow explained. The inclined part 5a has a straight inclined surface as viewed in a sectional view of the thrust bearing 5 in a plane containing the axis thereof.

Figure 3:
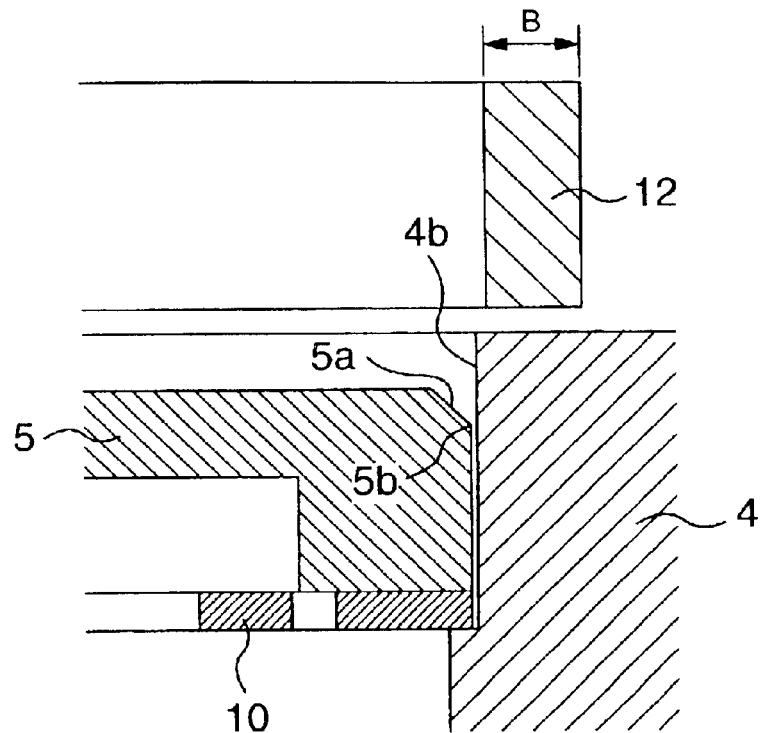
FIG. 3 is an enlarged sectional view illustrating a juncture between a thrust bearing and a bearing housing in the embodiment shown in FIG. 2 in a condition before joining thereof.

Referring to FIG. 3 which is a sectional view for explaining a step of plastic joining, the bearing housing 4 after machining is at first upset so that the coupling bore 4b is facing upward, and is held at its surface on the hub side by a suitable guide or the like. Then, the stopper ring 10 is inserted in the coupling bore 4b so as to be rested on the stepped part 4a, and then the thrust bearing 10 is fitted in the bore above the stopper ring 10. Thereafter, the bearing housing 4 is pressed by a press ram which is not shown through the intermediary of a ring-like punch 12 in a substantially plumbing direction, that is, the axial direction of the coupling bore 4b, around the coupling bore 4b over the entire periphery of the latter, by a load for causing a stress with which a substance in the part around the coupling bore 4b of the bearing housing 4 plastically flows toward the inner periphery thereof so as to cover the inclined part 5a of the thrust bearing 5 with the substance around the coupling bore 4b. Thus, the thrust bearing 5 and the bearing housing 4 are joined together.

In this embodiment, the bearing housing 4 is made of SUS303 while the thrust bearing 5 is made of SUS403, and the punch 12 has a width of 0.2 mm and is applied with a pressing load of 4 kN.

Although it is preferable that the inner diameter of the coupling bore 4b in the bearing housing 4 is equal to the outer diameter of the thrust bearing 5 as possible as it can, the inner diameter of the coupling bore 4b in the bearing housing 4 may be slightly larger than the outer diameter of the thrust bearing 5 in order to enhance the workability. In this embodiment, the inner diameter of the coupling bore 4b is 0.5 mm, and the outer diameter of the thrust bearing 5 is set so that a clearance between the bearing housing 4 and the thrust bearing 5 becomes 0.01 mm.

Figure 4:
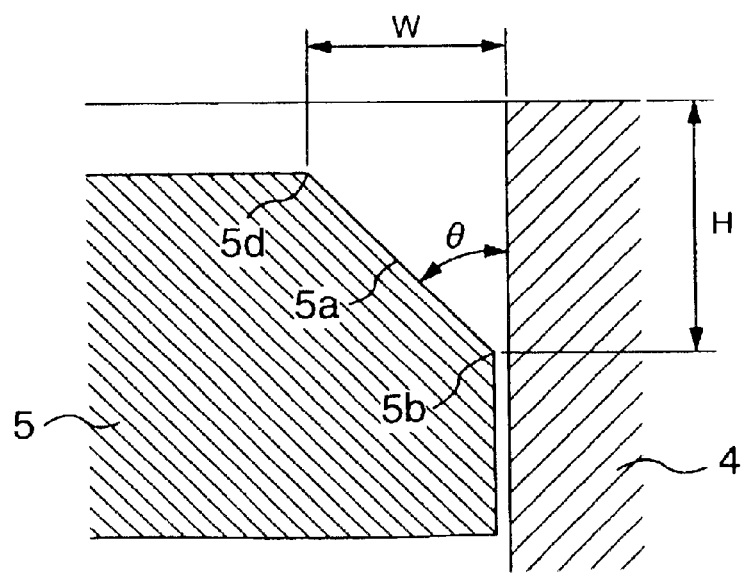
FIG. 4 is an explanatory view exhibiting parameters affecting upon the bonding strength of the juncture between the thrust bearing and the bearing housing in the first embodiment of the present invention.

Referring to FIG. 4 which is an enlarged longitudinal sectional view illustrating a configuration of the outer peripheral edge of the lower end of the thrust bearing 5 formed with the inclined surface 5b before plastic deformation, factors for determining a sectional shape of the joined part (the inclined part 5a), are a depth H, a width W and an inclined angle θ of the inclined part 5a.

At first, the depth H is the axial distance from the end surface of the bearing housing 4 on the thrust bearing 5 side to an end part 5b of the inclined part 5a of the thrust bearing 5 (that is, the axial distance from the lower end surface of the bearing housing 4 to the large diameter end part of the inclined part 5a of the thrust bearing 5). Should the depth H be too shallow, no sufficient bonding strength could be obtained, and accordingly, the juncture would readily plastically deformed when a downward external force is exerted to the thrust bearing 5 after joining. On the contrary, should the depth H is too deep, the inflow of the material covering the inclined part, 5a, caused by the plastic flow, would be insufficient so that an air gap is caused. Thus, the bonding strength would also be lowered. Thus, the depth H is preferably in a range from about 0.05 to 0.5 mm. In this embodiment, the depth H is set to 0.1 mm.

Next, the width W of the inclined part 5a is equal to a distance between the inner peripheral surface of the bearing housing 4 to a small diameter side end 5b of the inclined part 5a. Should the width W be small, the contact surface of the inclined part 5a would become small, and accordingly, no sufficient bonding strength could not be obtained. Further, the sealing ability of the joining portion would be deteriorated. Thus, the width W is preferably not less than 0.02 mm. In this embodiment, the width W is set to 0.05 mm.

The inclined angle θ is the one between the inner surface of the bearing housing 4 and the inclined part 5a of the thrust bearing 5 as viewed in a sectional view cut through a plane containing the axis of the bearing housing 4. The larger the angle θ, the more difficult the covering of the inclined part 5a with the material of the bearing housing 4, the sealing ability of the juncture becomes lower. Further, the smaller the inclined angle θ, the lower the bonding strength. The inclined angle θ is preferably in a range from 30 to 60 deg. In this embodiment, the inclined angle θ is set to 45 deg.

Figure 5:
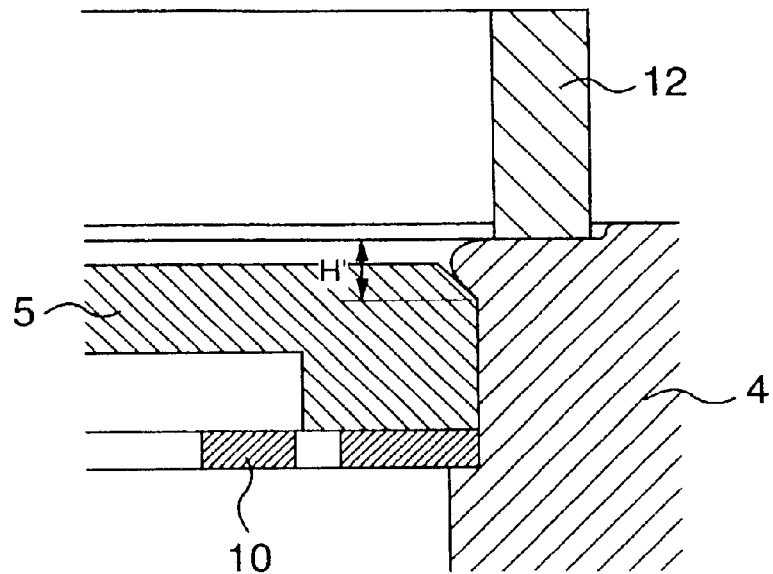
FIG. 5 is an enlarged sectional view illustrating the juncture between the thrust bearing and the bearing housing in the embodiment shown in FIG. 2 in a condition after joining thereof.

Referring to FIG. 5 which is an enlarged sectional view illustrating the juncture formed in the above-mentioned condition, the material (basic material) of the inner peripheral edge at the lower end part of the bearing housing 4 plastically flows so as to bulge toward and cover the inclined part 5a thereover, and accordingly, the thrust bearing 5 and the bearing housing 4 are joined and sealed to each other. The shearing length H' (the axial distance from the large diameter side end part 5b of the inclined part 5a to the inclined part 5a to the end surface 4c of the bearing housing 4 after deformation) of the plastically deformed part of the bearing housing 4 greatly contributes to the bonding strength. In this embodiment, the shearing length H' becomes 0.09 mm, and accordingly, a drawing force required for axially pulling out the thrust bearing 5 from the bearing housing 4 becomes not less than 500 Nt, that is, a tough bonding strength can be obtained.

As mentioned above, in the part with which the inclined part 5a is covered through the plastic deformation, the metal structure is flattened along its surface so as to have a shape different from that of the metal structure remote therefrom.

According to the configuration of this embodiment as stated above, as shown in FIG. 5, by causing the bearing housing 4 to plastically flow so as to cover the inclined part 5a on the outer peripheral edge at the lower end part of the thrust bearing 5, the thrust bearing 5 can be joined in the coupling bore 4b of the bearing housing 4 with a high bonding strength, and further, a high degree of sealing ability can be obtained by the residual contact pressure between the bearing housing 4 deformed through plastic flow and the thrust bearing 5.

Further, since no heat is applied during the joining, no thermal strain is caused, and accordingly, there would be caused no risk of lowering the processing accuracy. Further, as mentioned above, the load applied axially to the bearing housing 4 through the intermediary of the punch 12 may be a value which can cause the material around the coupling bore 4b in the bearing housing 4 to plastically flow. Further, since the load is applied over the entire circumference, a force applied to the thrust bearing 5 and the dynamic pressure bearing metal 3 is circumferentially uniform, and accordingly, no deformation is caused in both the thrust bearing 5 and the hydrodynamic bearing metal 3. That is, the load which is axially applied to the bearing housing 4 through the intermediary of the punch 12 does not cause a risk of lowering the processing accuracy.

Second Embodiment

Figure 6:
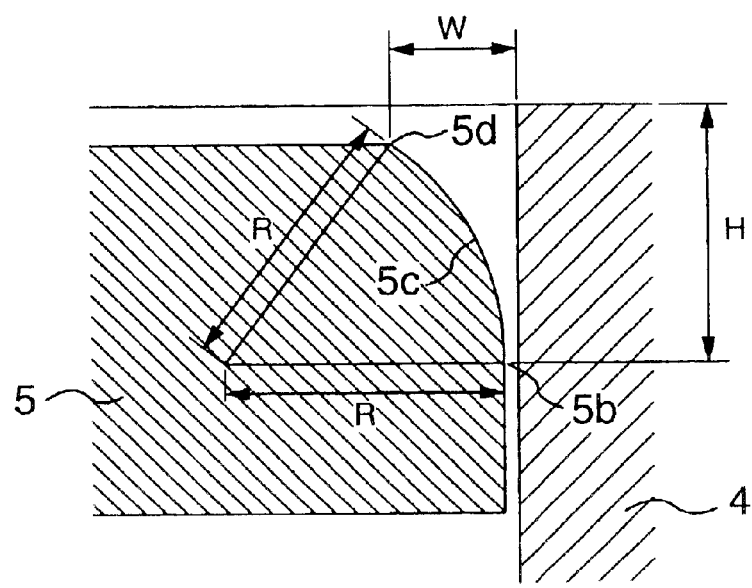
FIG. 6 is a longitudinal sectional view illustrating a second embodiment of the present invention.

Referring to FIG. 6 which is an enlarged longitudinal sectional view illustrating a juncture before plastic deformation in a second embodiment of the present invention, in this embodiment, the outer peripheral edge at the lower end part of the thrust bearing 5 has a shape which is exhibited by a curve having a radius R of curvature, as viewed in a section cut through a plane containing the axis of the thrust bearing 5 (that is, it has a round surface 5c), which should be compared with the first embodiment in which the outer peripheral edge at the lower end part of the thrust bearing 5 has a straight line shape as viewed in a section cut through a plane containing the axis of the thrust bearing 5. Further, as shown in FIG. 6, with this shape, the large diameter side end of the round surface 5c is smoothly contiguous to the outer diameter of the thrust bearing 5. Except the above-mentioned matters, the configuration of the second embodiment is the same as that of the first embodiment.

In this embodiment, the sectional shape of the joining part (round surface 5c) is determined by those factors which are a depth H, a round surface width W and a radius R.

The depth H is an axial distance, similar to the first embodiment, from the axially lower end surface of the bearing housing 4 on the thrust bearing 5 side to an end part 5b of the round surface 5c of the thrust bearing 5 (that is, the distance from the axially lower end surface of the bearing housing 4 to the large diameter side end of the round surface 5c of the thrust bearing 5). The depth H can be determined to a value preferably in a range about 0.05 to 0.5 mm by a reason similar to that stated in the first embodiment. In this embodiment, the depth H is set to 0.12 mm.

The round surface width W is a distance from the inner peripheral surface of the bearing housing 4 to a small diameter side end part 5d of the round surface 5c. This width W can be determined by a reason similar to the configuration of the end part of the thrust bearing 5 having the inclined surface, to a value not less than 0.02 mm. In this embodiment, the round surface width W is set to 0.05 mm.

Next, the radius R is, similar to the inclined surface, the larger the diameter R, the smaller the angle θ. Thus, the radius R is preferably 1 to 2 times as large as the round surface width W. In this embodiment, the radius is set to 0.5 mm.

In view of the above-mentioned condition, the outer peripheral edge at the lower end part of the thrust bearing is formed into a round surface with which the bearing housing 4 is joined to the thrust bearing 5. Thus, the drawing force by which the thrust baring 5 is pulled out from the bearing housing 4 becomes not less than 500 Nt, that is, a high bonding strength can be obtained.

Figure 7:
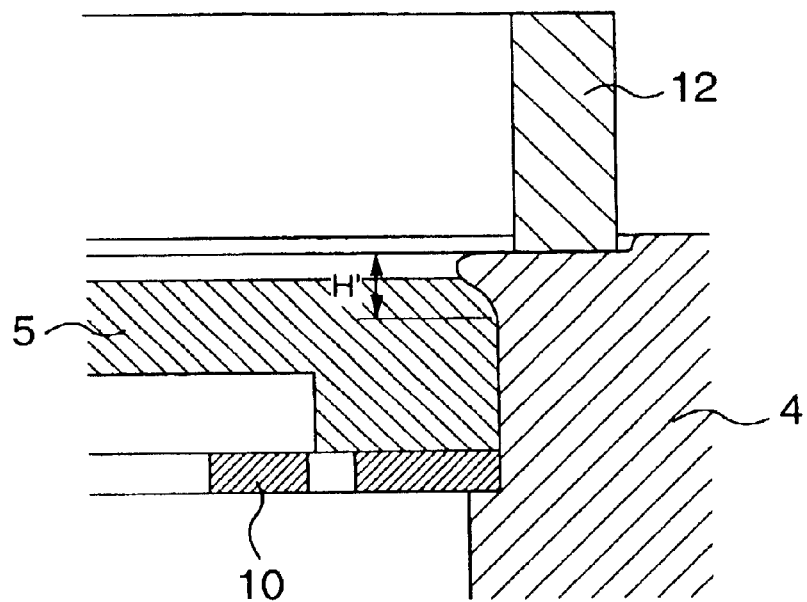
FIG. 7 is an enlarged sectional view illustrating a juncture between a thrust bearing and a bearing housing in the embodiment shown in FIG. 6, in a condition after joining thereof.

With the configuration of this embodiment as stated above, the inner peripheral surface of the lower end part of the bearing housing 4 is subjected to plastic flow so as to cover the round surface 5c of the thrust bearing 5 at the outer periphery thereof, and accordingly, the thrust bearing 5 can be joined in the coupling bore of the bearing housing 4 with a high bonding strength, as shown in FIG. 7, and a high sealing ability can be obtained by a residual contact pressure between the bearing housing 4 subjected to plastic flow, and the thrust bearing 5. Further, no heat is required during the joining, no thermal strain is caused, thereby it is possible to prevent occurrence of a risk of lowering the processing accuracy thereof.

Third Embodiment

Figure 8:
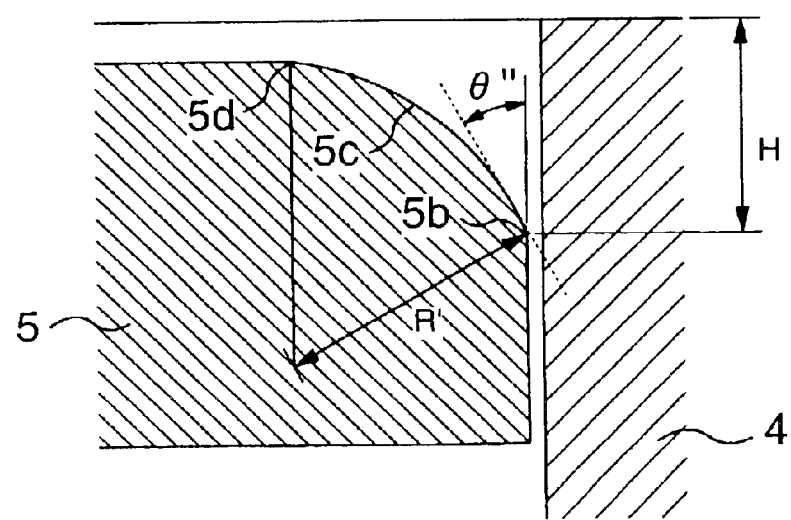
FIG. 8 is a longitudinal sectional view illustrating a third embodiment of the present invention.

Referring to FIG. 8 which is an enlarged longitudinal sectional view illustrating a juncture before plastic deformation in a third embodiment of the present invention, the configuration of this embodiment is the same as that of the second embodiment, except that the large diameter side end part 5b of the round surface 5c of the thrust bearing 5 is smoothly contiguous to the outer diameter of the thrust bearing 5, being not smooth thereto although the small diameter side end part 5d of the round surface 5c of the thrust bearing 5 is contiguous to the axially lower end surface of the thrust bearing 5, that is, the end part 5d of the round surface 5c is clearly distinguished. This configuration should be compared with the second embodiment in which the large diameter side end part 5b of the round surface 5c at the end part of the thrust bearing 5 is smoothly contiguous to the outer diameter of the thrust bearing 5.

In this embodiment, the sectional shape of the juncture (round surface 5c) can be determined by the factors which are a depth H, a radius R' of the round surface 5c and an angle θ" of a tangential line to the round surface 5c at the end part 5b of the latter.

The depth H may be determined by a reason similar that stated in the first embodiment, and accordingly, it is preferably in a range from 0.05 to 0.5 mm. In this embodiment, the depth H is set to 0.12 mm.

The smaller the radius R' of the round surface 5c, the smaller the contact area at the round surface, no sufficient bonding strength can be obtained, and further, the sealing ability of the juncture is deteriorated. Thus, the radius R' of the round surface 5c is preferably not less than 0.02 mm. In this embodiment, the radius R' of the round surface 5c is set to 0.1 mm.

The angle θ" of the tangential line to the round surface 5c at the end part 5b is preferably in a range from 30 to 60 deg. In this embodiment, the angle θ" of the tangential line is set to 45 deg.

With the above-mentioned condition, the thrust bearing 5 and the bearing housing 4 are joined with each other in a method similar to that stated in the first embodiment in which the bearing housing 4 is subjected to plastic flow. Thus, a high bonding strength can be obtained so that the drawing force by which the thrust bearing 5 is axially pulled out from the bearing housing 4 becomes not less than 500 Nt.

Figure 9:
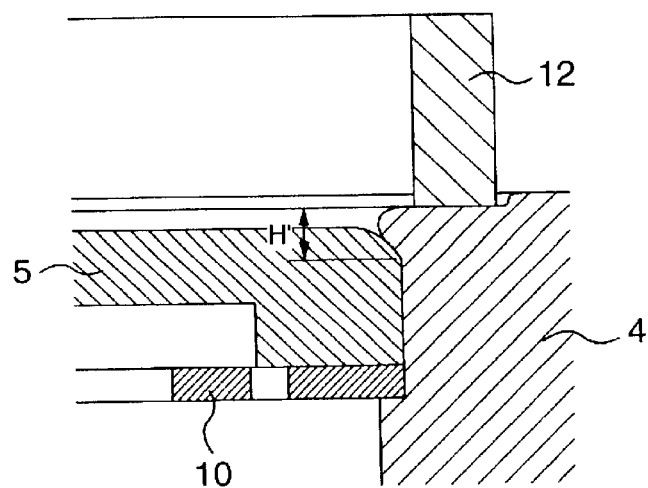
FIG. 9 is an enlarged sectional view illustrating a juncture between a thrust bearing and a bearing housing in the embodiment shown in FIG. 8, in a condition after joining thereof.

With the configuration of the embodiment as mentioned above, the part which has a curve having a radius R of curvature as viewed in a section cut through a plane containing the axis of the thrust bearing 5, and which has a tangential line with an angle in a predetermined range with respect to the outer peripheral surface of the thrust bearing 5 at the crossing point between the curve and the outer peripheral surface of the thrust bearing 5 is formed on the outer peripheral edge at the lower end part (round surface) of the thrust bearing 5, and the bearing housing 4 is subjected to plastic flow so as to cover the round surface 5c. Thus, as shown in FIG. 9, the thrust bearing 5 can be joined in the coupling bore of the bearing housing 4 at the center thereof with a high bonding strength, and a high sealing ability can be obtained between the bearing housing 4 and the thrust bearing 5 due to a residual contact pressure between the bearing housing 4 subjected to plastic flow and the thrust bearing 5. Further, since no heat is applied during joining, there is no risk of lowering the processing accuracy.

Fourth Embodiment

In a fourth embodiment, the inner diameter of the coupling bore of the bearing housing 4 is set to 7.0 mm while the outer diameter of the thrust bearing 5 is set so that the clearance between the bearing housing 4 and the thrust bearing 5 is set to 0.1 mm, and the pressing load is set to 4.8 kN. Except the above-mentioned matters, the configuration of this embodiment is the same as that of the first embodiment.

With the above-mentioned condition, a high bonding strength can be obtained so that the bearing housing 4 and the thrust bearing 5 are coupled to each other, that is, a drawing force by which the thrust bearing 5 is removed from bearing housing 4 is becomes not less than 500 N.

With the configuration as stated above, as shown in FIG. 5, the plastic flow of the bearing housing 4 is carried out so as to cover the inclined part of the thrust bearing 5 which has an inclined surface at the outer periphery thereof, and accordingly, the thrust bearing 5 can be joined to the coupling bore, having a high bonding strength, and further, a high sealing ability can be obtained between the bearing housing 4 and the thrust bearing 5 due to the residual contact pressure between the bearing housing 4 subjected to plastic flow and the thrust bearing 5. Similar to the above-mentioned embodiments, no thermal strain is caused during joining between the bearing housing 4 and the thrust bearing 5, and accordingly, there is no risk of lowering the processing accuracy.

Further, all embodiments stated above can be manufactured by inexpensive facilities, thereby it is possible to aim at enhancing the productivity and reducing the cost.

According to the present invention, the juncture between the thrust bearing and the bearing housing can obtain a sufficient bonding strength without deteriorating the sealing ability.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A spindle motor including a stator core, and comprising, inside of the stator core, a cylindrical bearing housing, a hydrodynamic bearing metal and a shaft fixed at its one end to a hub, which are coaxially arranged in the mentioned order as viewed inward from the stator core, and further comprising:

a thrust bearing fixed to an inner peripheral surface at an end part of the bearing housing on the side remote from the hub, for bearing a thrust of the shaft, a fluid filled between the shaft and the hydrodynamic bearing metal, wherein an annular inclined surface is formed on an outer peripheral edge at the end part of the thrust bearing on the side axially remote from the hub, the annular inclined surface having an outer diameter which decreases toward the end part on the side axially remote from the hub, and wherein an inner peripheral edge at the end part of the bearing housing on the side axially remote from the hub is plastically deformed and bulged out toward the annular inclined surface at the end part of the thrust bearing so as to form an annular budged portion along the entire inner peripheral edge at the end part of the bearing housing, to abut against and join with the annular inclined surface.

2. A spindle motor including a stator core, and comprising, inside of the stator core, a cylindrical bearing housing, a hydrodynamic bearing metal and a shaft fixed at its one end to a hub, which are coaxially arranged in the mentioned order as viewed inward from the stator core, and comprising:

a thrust bearing fixed to an inner peripheral surface at an end part of the bearing housing on the side remote from the hub, for bearing a thrust of the shaft; and a fluid filled between the shaft and the hydrodynamic bearing metal, wherein an annular inclined surface is formed on an outer peripheral edge at the end part of the thrust bearing on the side axially remote from the hub, the annular inclined surface having an outer diameter which decreases toward the end part axially remote from the hub, and wherein an inner peripheral edge at the end part of the bearing housing on the side axially remote from the hub is plastically deformed and bulged out toward the annular inclined surface at the end part of the thrust bearing so as to form an annular budged portion along the entire inner peripheral edge at the end part of the bearing housing, to abut against and join with the annular inclined surface, the annular bulged portion having a metal structure which is flatted in a direction along outer surface.

3. A spindle motor as stated in claim 1, wherein the inclined surface formed in the thrust bearing has such a sectional shape in a cutting plane containing the axis of the thrust bearing as to be of a straight line or a part of an arc.

4. A spindle motor as stated in any one of claims 1 to 3, the annular inclined surface formed on the outer peripheral edge of the thrust bearing at an end on the large diameter side thereof is made into contact with the inner peripheral of the bearing housing.

5. A spindle motor as stated in any one of claims 1 to 3, wherein a part having a diameter smaller than that of the outer periphery of the thrust bearing is present in the bearing housing, coaxial therewith, and the thrust bearing is interposed with the annular budged portion of the bearing housing and a stepped part at the end surface of the small diameter part of the thrust bearing, directly or through the intermediary of other members.

6. A method of manufacturing a spindle motor including a stator core, and inside of the stator core, a cylindrical bearing housing, a hydrodynamic bearing metal and a shaft fixed at its one end to a hub, which are coaxially arranged in the mentioned order as viewed inward from the stator core, and also comprising a thrust bearing fixed to an inner peripheral surface in an end part of the bearing housing on the side remote from the hub, for bearing a thrust of the shaft, fluid being filled between the shaft and the hydrodynamic bearing metal, comprising the steps of:

forming an annular inclined surface having a diameter which is decreased toward the end part of the thrust bearing on the side axially remote from the hub, on an outer peripheral edge at the end part of the thrust bearing on the side axially remote from the hub;

fitting the thrust bearing in the bearing housing up to a predetermined position; and pressing an inner peripheral edge at the end part of the bearing housing on the side remote from the hub, simultaneously over its entire periphery in the axial direction so as to cause plastic flow of the inner peripheral surface of the bearing housing which therefore bulges out toward the annular inclined surface of the thrust bearing, so as to form an annular budged portion along the entire inner peripheral edge at the end part of the bearing house, to abut against and join with the annular inclined surface of the thrust bearing.

7. A method as claimed in claim 6, where the annular inclined surface formed in the thrust bearing has such a sectional shape as to be of a straight line or a part of an arc in a cutting plane containing the axis of the thrust bearing.

8. A spindle motor as claimed in claim 1, where the annular inclined surface formed in the thrust bearing has such a sectional shape as to be of a straight line in a cutting plane containing the axis of the thrust bearing based on factors, including a depth (H) indicating an axial distance from the end surface of the bearing housing on the thrust bearing and the end part of the thrust bearing, a width (W) of the inclined surface, and an inclined angle (θ).

9. A spindle motor as claimed in claim 8, where the depth (H) is set in a range of 0.05 to 0.5 mm, the width (W) is set no less than 0.02 mm, and the inclined angle (θ) is set in the range of 30° to 60°.

10. A spindle motor as claimed in claim 8, where the depth (H) is set at 0.1 mm, the width (W) is set at 0.05 mm, and the inclined angle (θ) is set at 45°.

11. A spindle motor as claimed in claim 2, where the annular inclined surface formed in the thrust bearing has such a sectional shape as to be of a straight line in a cutting plane containing the axis of the thrust bearing based on factors, including a depth (H) indicating an axial distance from the end surface of the bearing housing on the thrust bearing and the end part of the thrust bearing, a width (W) of the inclined surface, and an inclined angle (θ).

12. A spindle motor as claimed in claim 11, where the depth (H) is set in a range of 0.05 to 0.5 mm, the width (W) is set no less than 0.02 mm, and the inclined angle (θ) is set in the range of 30° to 60°.

13. A spindle motor as claimed in claim 11, where the depth (H) is set at 0.1 mm, the width (W) is set at 0.05 mm, and the inclined angle (θ) is set at 45°.

14. A method as claimed in claim 6, where the annular inclined surface formed in the thrust bearing has such a sectional shape as to be of a straight line in a cutting plane containing the axis of the thrust bearing based on factors, including a depth (H) indicating an axial distance from the end surface of the bearing housing on the thrust bearing and the end part of the thrust bearing, a width (W) of the inclined surface, and an inclined angle (θ).

15. A method as claimed in claim 14, where the depth (H) is set in a range of 0.05 to 0.5 mm, the width (W) is set no less than 0.02 mm, and the inclined angle (θ) is set in the range of 30° to 60°.

16. A method as claimed in claim 14, where the depth (H) is set at 0.1 mm, the width (W) is set at 0.05 mm, and the inclined angle (θ) is set at 45°.

* * * * *